Nov. 18, 1941.  F. W. WOLFF ET AL  2,263,228
SPEED-RESPONSIVE PHOTOELECTRIC DEVICE
Filed March 17, 1939   2 Sheets-Sheet 1
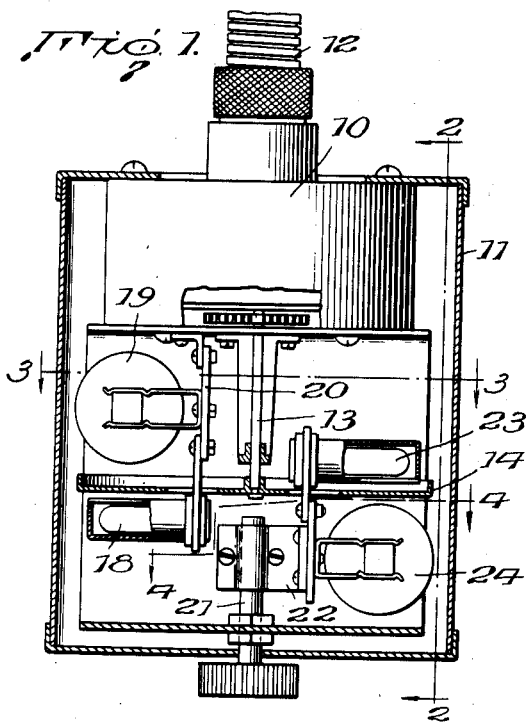
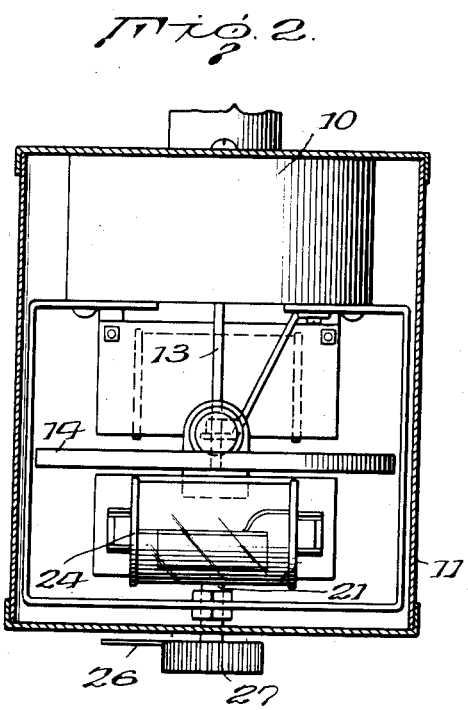
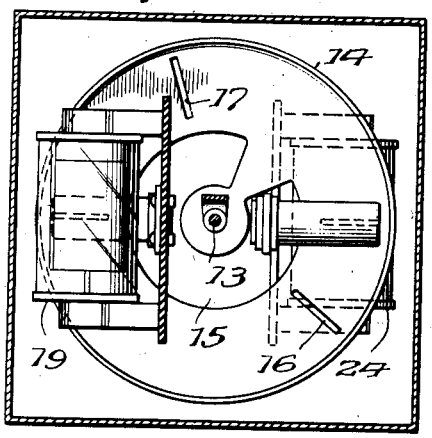
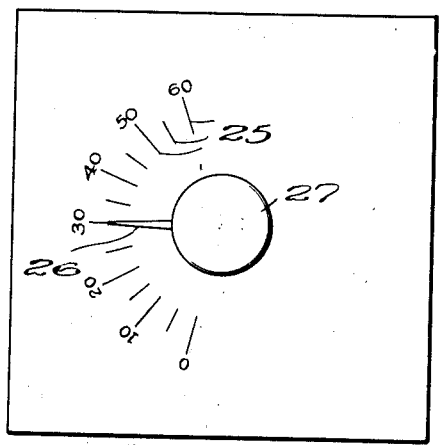
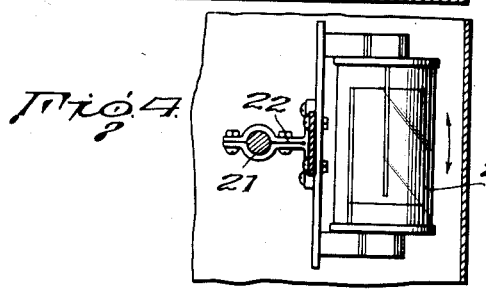
Inventors
F. W. Wolff
E. A. Bejoian
By Church & Church
Their Attorneys

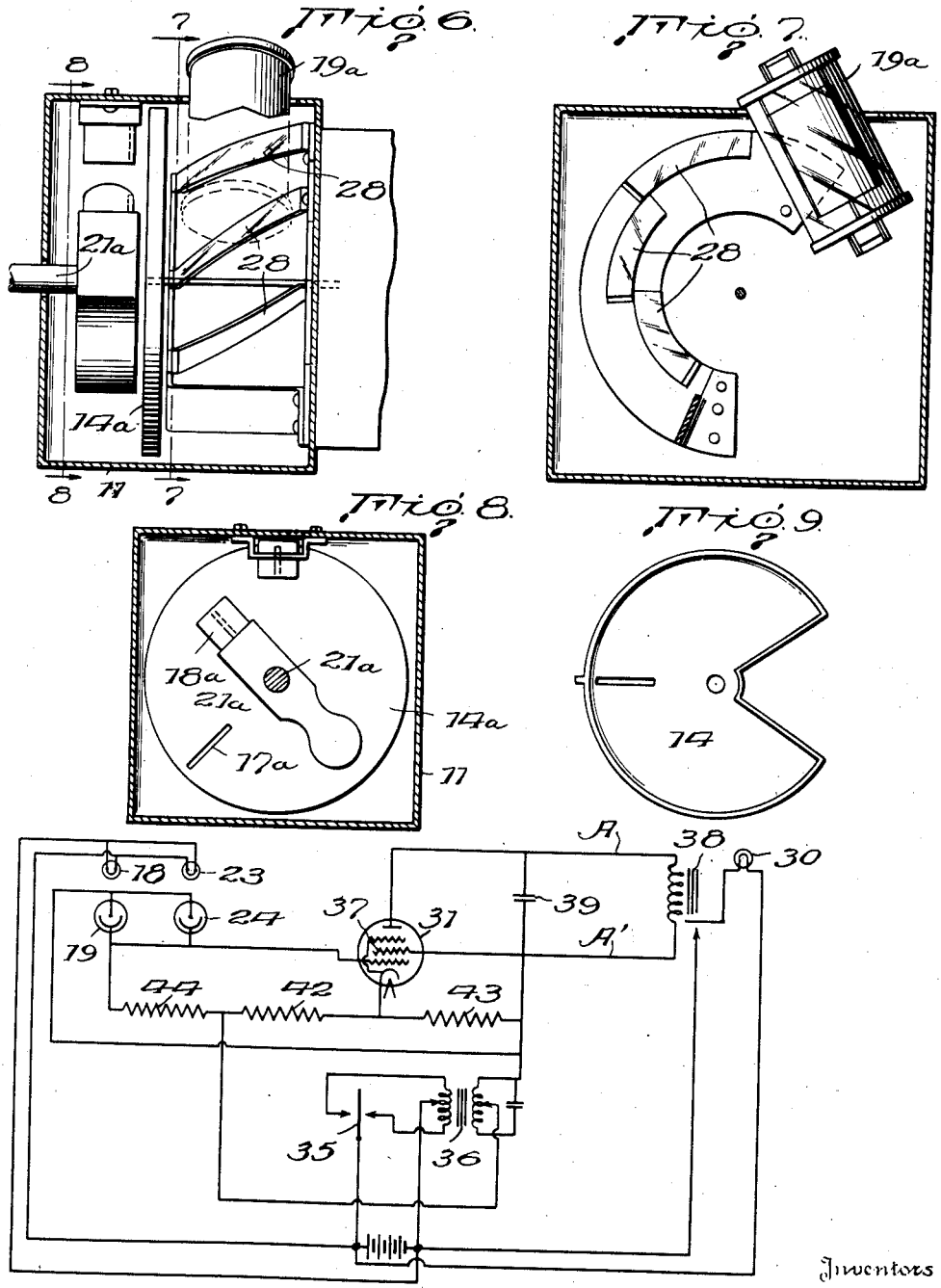

Patented Nov. 18, 1941

2,263,228

UNITED STATES PATENT OFFICE 2,263,228

SPEED-RESPONSIVE PHOTOELECTRIC DEVICE

Fred W. Wolff, Harrisburg, Pa., and Edward A. Beloian, Wilmette, Ill.

Application March 17, 1939, Serial No. 262,494

1 Claim. (Cl. 250—41.5)

This invention relates to speed-responsive devices especially adapted for use in connection with automobiles.

One object of the invention is to provide a speed-responsive device capable of establishing an electrical circuit through the medium of a light-sensitive cell when the vehicle with which the mechanism is equipped attains a predetermined speed.

A further object of the invention is to provide a speed-responsive mechanism comprising a light-sensitive cell and a source of light normally inoperative by reason of a rotatable opaque member interposed between those elements, said opaque member having a light orifice therein adapted to expose the cell to the source of light when the vehicle attains a predetermined speed.

A still further object of the invention is to provide a speed-responsive mechanism comprising a rotatable ported disc interposed between a light-sensitive cell and a source of light, said cell and source of light being adjustable relatively to the port or light orifice whereby the device may be adjusted to operate at different speeds of the vehicle.

A still further object of the invention is to provide a speed-responsive device having a rotatable disc interposed between the light-sensitive cell and a source of light, said disc having a light opening therein through which a ray of light is projected from said source to a reflecting surface by which said ray is deflected to impinge on the light-sensitive cell.

With these and other objects in view, the invention consists in certain details of construction and combinations and arrangements of parts, all as will hereinafter be more fully described, and the novel features thereof particularly pointed out in the appended claims.

In the accompanying drawings—

Figure 1 is a plan view of the present instrument, the top of the casing having been removed to more clearly illustrate the structure;

Fig. 2 is a sectional view on the line 2—2 of Fig. 1;

Fig. 3 is a sectional view on the line 3—3 of Fig. 1;

Fig. 4 is a sectional view on the line 4—4 of Fig. 1;

Fig. 5 is an end view of the casing;

Fig. 6 is a longitudinal vertical sectional view illustrating a modified form of instrument;

Fig. 7 is a transverse sectional view on the line 7—7 of Fig. 6;

Fig. 8 is a similar view on the line 8—8 of Fig. 6;

Fig. 9 is a detail plan view of the disc by which the light is normally blocked-off from the light-sensitive cell; and Fig. 10 illustrates one electrical diagram for use in conjunction with the present device for actuating a signal.

In the embodiment of the invention illustrated in Figs. 1 to 5, the ordinary speedometer mechanism 10 is mounted within the casing 11, the usual connection 12 being provided for the speedometer, whereby the latter will be actuated by the rotary motion either of the wheels or transmission of the vehicle. The specific construction of the speedometer 10 forms no part of the present invention and, hence, is not shown nor described in detail. Suffice it to say that it comprises a shaft 13 adapted to be rotated or rocked in response to the action of the vehicle, the degree of rotation depending upon the speed attained by the vehicle. Mounted on this shaft 13 is a disc 14 having its central portion cut away, as indicated at 15, for purposes which will presently appear. In this, the preferred embodiment of the invention, the disc 14 has two light apertures or orifices 16, 17, formed therein. Light orifice 17 is adapted to cooperate with a source of light 18 and a light-sensitive cell 19, both mounted on a fixed bracket 20, which extends through the cut-away portion 15 of the disc, so as to position the light and cell at opposite sides of said disc. Normally, the parts are positioned as illustrated in Fig. 3, under which circumstances light from the source of light 18 is blocked-off from the cell 19, but as shaft 13 rotates in response to the speed of the vehicle, the light orifice 17 will move toward a position where, upon the vehicle reaching a predetermined speed, it will be alined with said source of light and cell, so that a ray of light from the source of light can impinge upon the cell. As stated, this source of light 18 and the cell 19 are fixed with respect to the disc 14 and, consequently, the cell 19 can only be affected by the light ray when the vehicle reaches the predetermined speed.

To facilitate adjustment of the device to render it operative at other speeds, there is journaled in the casing 11 a shaft 21, preferably in alinement with shaft 13 and, carried on a bracket 22, clamped on shaft 21, there is a second source of light 23 and a second light-sensitive cell 24 positioned at opposite sides of disc 14. Bracket 22 extends through the open portion 15 of the disc, but there is sufficient clearance to permit the cell 24 and the light 23 to be adjusted circumferentially of the disc, this adjustment being attained by merely rotating shaft 21. Thus, the source of light 23 and the cell 24 are adjustable with respect to the light orifice 16. Preferably, the exterior of the casing at the end through which the shaft 21 projects is provided with a series of graduations 25, on which the setting of the cell 24 and light 23 may be indicated by a pointer 26 carried on the shaft or knob 27 on the exterior end of shaft 21. With these dual sets of lights and cells, it is possible for the fixed set, i. e., light 18 and cell 19, to be used in the jurisdiction of which the owner of the vehicle is a resident, while the adjustable elements can readily be manipulated to indicate speeds of other jurisdictions through which the individual may be touring. For instance, the relative positions of the light opening 17 and disc 14 with respect to light 18 and cell 19 may be such that this light opening will register with said source of light and cell only when the vehicle attains a speed of, say, 45 M. P. H. while, on the other hand, light 23 and cell 24 would be adjusted to bring light orifice 16 into registry with them when the vehicle attains a speed of 30 M. P. H., as indicated on the graduations in Fig. 5. However, it will be appreciated that the adjustable elements, alone, may be used under both sets of circumstances.

In the construction illustrated in Figs. 6 to 9, there is a single light-sensitive cell 19a, fixed with respect to the disc 14a but, in this instance, the source of light 18a is adjustable with respect to the light orifice 17a, said source of light being mounted on a shaft 21a journaled in the casing 11. At the side of the disc 14a opposite said source of light, there is provided a reflecting surface of arcuate formation, a series of strips of reflecting material 28 preferably being provided, as illustrated in Figs. 6 and 7. The length of the light orifice 17a in disc 14a corresponds to the combined width of the several strips of reflecting material 28 and the disposition of the several reflecting strips is such that whenever the light orifice 17a moves into registry with the source of light 18a, the ray of light projected through the orifice will be deflected by the mirrors or other reflecting elements to impinge on the light-sensitive cell 19a. Thus, the speed at which the light-sensitive cell is affected by the ray of light may be varied by merely adjusting the position of the source of light 18a with respect to the light orifice 17a. The provision of the arcuate reflecting surfaces eliminates the necessity of adjusting the position of the light-sensitive cell in this modified form of the invention.

If desired, the disc 14 may take the form illustrated in Fig. 9, wherein a comparatively large segment is removed for accommodation of the brackets on which the light cells and lights are mounted.

In each form of the invention, when the disc moves to a position to permit the light ray to impinge on the light-sensitive cell, the latter causes an electric circuit to be established which circuit can be utilized for any desired purpose. For instance, in the wiring circuit illustrated in Fig. 10, a visible signal in the form of a lamp 30 is energized. In the arrangement of Fig. 10, the vacuum tube 31 is biased to cut off by means of the potential drop across resistor 42 or, in other words, under ordinary conditions, no plate current flows through tube 31. However, the light-sensitive cells 19, 24, are connected across potential drops of resistors 42, 43, in such a manner that they will decrease the bias on tube 31 when light from the light sources 18, 23, impinges on their cathodes. A vibrator 35 alternates the polarity of a low voltage current, preferably from a six-volt storage battery, across the primary of a transformer 36 and the high voltage across the secondary of said transformer serves as a high-voltage alternating operating current source, providing high voltage source for vacuum tubes and photo-cell which control, in this instance, the signal 30. When light from either light source, 18 or 23, impinges on the corresponding cell, 19 or 24, current will flow through said cell and cause a drop through resistor 44, causing control grid 37 of tube 31 to become more positive, thereupon causing current to flow through the vacuum tube and energizing relay 38. This circuit for signal 30 is thus closed by the relay. Preferably, there is provided a fixed condenser 39 of sufficiently high value to cause relay 38 to remain closed while energized because, otherwise, the alternating current across the relay will cause it to chatter.

What we claim is:

In an indicator of the class described, a light-sensitive cell, a source of light, a rotatable disc interposed between said cell and light, said disc having an opening therein movable into registry with said source of light when the vehicle attains a predetermined speed, and an arcuate reflecting surface on which light passing through said opening impinges and is reflected to said cell, said reflecting surface being arranged concentrically of said disc and said source of light being adjustable circumferentially of said disc and reflecting surface.

FRED W. WOLFF.
EDWARD A. BELOIAN.